(12) United States Patent
Palmeri

(10) Patent No.: US 8,096,326 B2
(45) Date of Patent: Jan. 17, 2012

(54) FLUID LINE AND METHOD OF MAKING THE SAME

(75) Inventor: Gaëtan Palmeri, Malancourt la Montagne (FR)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 12/538,459

(22) Filed: Aug. 10, 2009

(65) Prior Publication Data

US 2010/0037972 A1    Feb. 18, 2010

(30) Foreign Application Priority Data

Aug. 14, 2008    (DE) .................. 10 2008 037 740

(51) Int. Cl.
*F16L 11/00*    (2006.01)
(52) U.S. Cl. .................. 138/121; 138/177; 138/173
(58) Field of Classification Search .................. 138/121, 138/173, 122; 285/226, 903, 236, 237
See application file for complete search history.

(56) References Cited

U.S. PATENT DOCUMENTS

| | | | |
|---|---|---|---|
| 2,143,960 A | | 1/1939 | Stalter et al. |
| 3,578,777 A | * | 5/1971 | DeGain .................. 138/121 |
| 3,605,817 A | * | 9/1971 | Bauman et al. .................. 138/121 |
| 3,715,454 A | * | 2/1973 | Kleykamp .................. 174/47 |
| 4,592,231 A | * | 6/1986 | Kant .................. 73/295 |
| 5,439,035 A | * | 8/1995 | Dal Palu .................. 138/121 |
| 5,564,472 A | * | 10/1996 | Gipperich .................. 138/121 |
| 5,706,864 A | * | 1/1998 | Pfleger .................. 138/121 |
| 5,792,532 A | * | 8/1998 | Pfleger .................. 428/36.9 |
| 6,659,135 B2 | * | 12/2003 | Sorkin .................. 138/121 |
| 6,666,233 B1 | * | 12/2003 | Sorkin .................. 138/121 |
| 6,698,456 B2 | * | 3/2004 | Neubauer et al. .................. 138/121 |
| 6,889,714 B1 | * | 5/2005 | Sorkin .................. 138/121 |
| 7,147,007 B2 | | 12/2006 | Renaud |
| 7,253,361 B2 | * | 8/2007 | Nishijima et al. .................. 174/72 A |
| 2002/0083991 A1 | * | 7/2002 | Sorkin .................. 138/121 |
| 2007/0113912 A1 | * | 5/2007 | Lawrence .................. 138/121 |
| 2009/0000682 A1 | * | 1/2009 | Kisu et al. .................. 138/121 |

FOREIGN PATENT DOCUMENTS

| | | |
|---|---|---|
| DE | 44 32 584 C1 | 1/1996 |
| DE | 197 07 518 C1 | 4/1998 |
| EP | 1 267 111 A1 | 12/2002 |

* cited by examiner

*Primary Examiner* — Patrick F Brinson
(74) *Attorney, Agent, or Firm* — Greenblum & Bernstein, P.L.C.

(57) ABSTRACT

A fluid line includes at least one corrugated section having wave peaks and wave troughs and at least one tie rod arranged in at least one portion of the corrugated section and being coupled to plural wave peaks. A method of making the fluid line includes forming at least one corrugated section at an end area or beginning area of a generally cylindrical section of the fluid line.

24 Claims, 1 Drawing Sheet

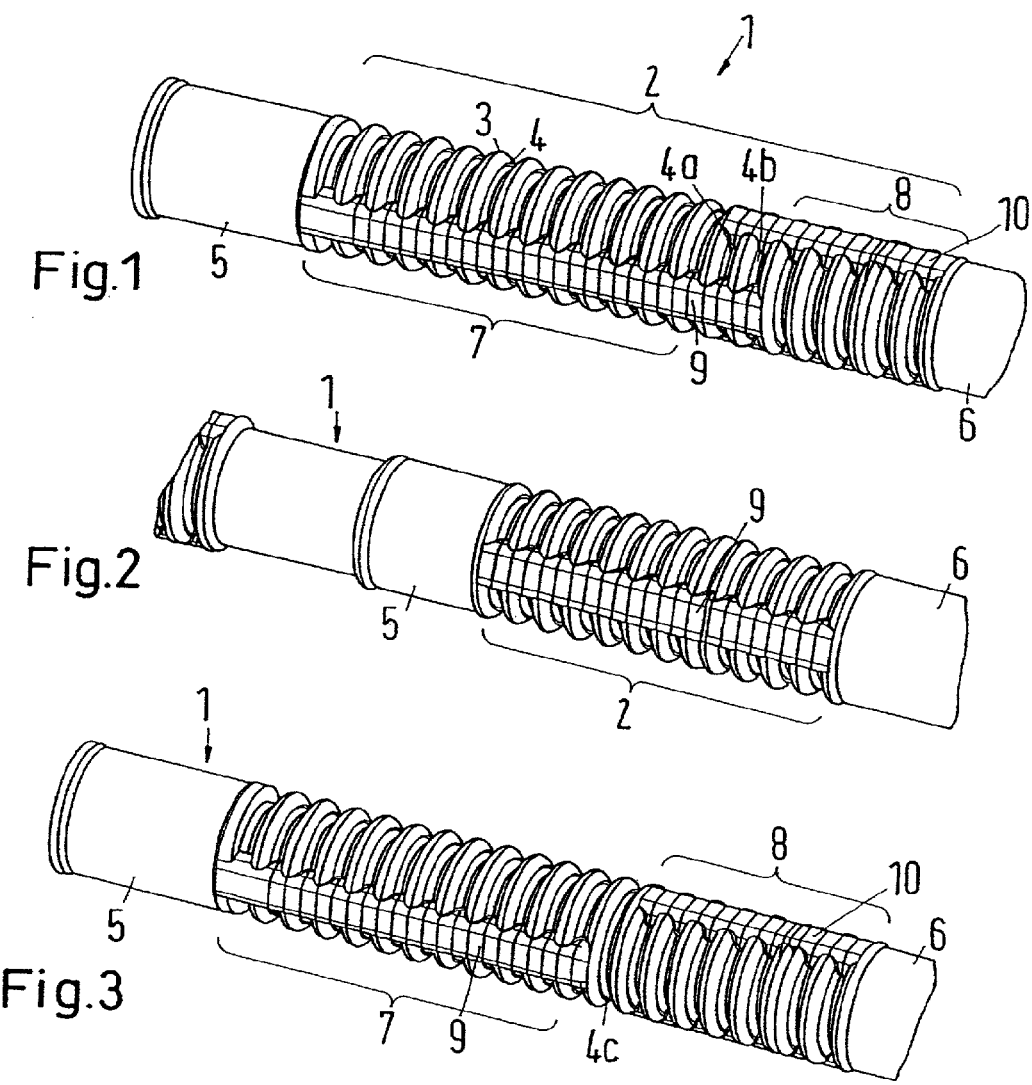
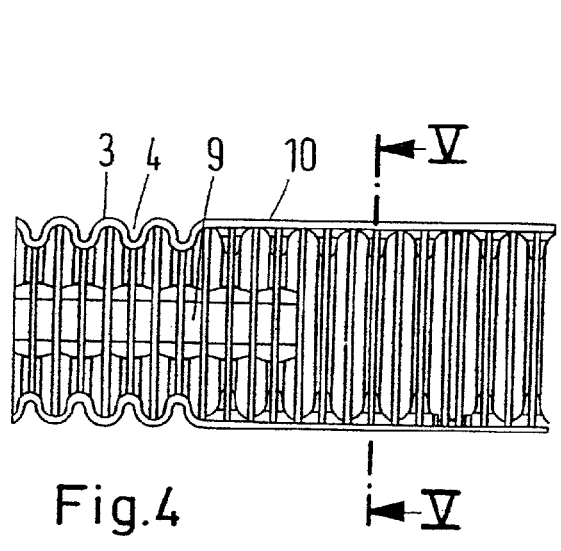

FLUID LINE AND METHOD OF MAKING THE SAME

CROSS-REFERENCE TO RELATED APPLICATIONS

The present application claims priority under 35 U.S.C. §119 of German Patent Application No. DE 10 2008 037 740.6 filed Aug. 14, 2008, the disclosure this German priority document is expressly incorporated by reference herein in its entirety.

BACKGROUND OF THE INVENTION

1. Field of the Invention

The invention relates to a fluid line with at least one corrugated section that has wave peaks and wave troughs. The invention also relates to method of making the fluid line includes forming at least one corrugated section at an end area or beginning area of a generally cylindrical section of the fluid line 2. Discussion of Background Information A fluid line of this type is known, for example, from DE 44 32 584 C1. A line of this type can be curved in the corrugated section. As a result, a greater freedom in the line routing is achieved. On the other hand, with a fluid line of this type it is also possible to connect elements to one another, the positions of which change relative to one another. One application of the live is its use in a motor vehicle, for example, as a line for a liquid.

Although the corrugated section makes it possible to bend the line, it has the disadvantage that the fluid line has a reduced dimensional stability in the corrugated section. In particular, there is a risk that the fluid line changes its length in the corrugated section when pressure fluctuations occur therein. In the case of synthetic material-fluid lines, this applies, in particular, when a higher temperature prevails at the same time.

It is therefore proposed in DE 44 32 584 C1, cited above, to connect respectively two adjacent wave peaks to one another by webs, wherein the webs are offset by 90° with respect to one another in adjacent wave troughs in the circumferential direction of the line. In an alternative embodiment, it is proposed to embody the wave peaks in an oval shape, in the shape of an ellipse, or in the shape of a circle flattened on one side. However, it can be observed that in admissibly large changes in length occur, even with an embodiment of this type, when the pressure in the interior of the fluid line changes.

A similar embodiment is known from DE 197 07 518 C1. In this document, two jacket lines, lying approximately opposite each other, of the jacket surface of the fluid line are kept free of wave peaks. These jacket lines extend in the longitudinal direction of the fluid line. However, it can be observed here too that changes in length occur that can no longer be tolerated for many applications, in particular, in the field of motor vehicles. For example, when a fluid line of this type is installed in an engine compartment of a motor vehicle, and the length or the diameter thereof increases beyond a predetermined level, there is a risk that the fluid line will bear against other parts that are arranged in the engine compartment, or against a boundary wall of the engine compartment, and will rub there. When this occurs with the vibrations that are unavoidable in a motor vehicle, sooner or later this will lead to damage to the fluid line.

SUMMARY OF THE INVENTION

The invention aims to keep a change in length small in a fluid line with at least one corrugated section.

The invention provides for a fluid line of the type mentioned at the outset in that all of the wave peaks are connected to one another by at least one tie rod at least in one partial section of the section.

The tie rod thus reliably prevents wave peaks from moving apart from one another, namely in the entire partial section. A partial section has a larger number of wave peaks and wave troughs so that it can be curved or bent to a sufficient extent. Preferably a partial section has at least five wave peaks. The tie rods have a virtually or essentially unchangeable length. The length of the tie rods can be changed only to the extent that the material from which the tie rods are made changes per se. Since the tie rod bridges several adjacent wave troughs, the partial section is stable in length in all of these wave troughs, i.e., regardless of the pressures that act in the interior of the fluid line. The spacing of all of the wave peaks in the partial section virtually or essentially do not change. A change in length can remain less than about 5%. The shape of the fluid line is maintained after a thermofixing to a particularly good extent. Each tie rod also functions to resist or prevent bending of the partial section along certain directions by resisting tension and/or compression forces.

Preferably, the wave peaks are connected to one another by two tie rods. These two tie rods can preferably lie diametrically opposite one another. This produces a further improved consistency of the length of the partial section. The holding forces which act against a change in length with a change in pressure in the line are thus virtually doubled and distributed over the circumference of the fluid line in a favorable manner.

Preferably, the tie rod fills the wave troughs between the wave peaks. This means that the tie rod has a radial extension from the wave trough, which extension corresponds to the height of the wave peaks, wherein a deviation of ± about 30% is permissible. In general, however, it is advantageous if the tie rod outside surface ends approximately with the wave peaks.

Preferably, in the area of the wave troughs, the fluid line has an interior cross section that follows an exterior cross section of the fluid line. Accordingly, in the area of the tie rod, the fluid line has a recess projecting radially outwards from the wave trough. This facilitates production and keeps the material consumption and thus the mass of the fluid line low.

In a preferred embodiment of the invention, tie rods are arranged in partial sections that are adjacent in the longitudinal direction. These tie rods can be offset with respect to one another by a predetermined angle in the circumferential direction of the fluid line. These partial sections can thus be curved in different directions.

It is particularly preferred that the tie rods of adjacent partial sections in the longitudinal direction of the fluid line overlap one another by at least one wave trough. A constant length (or consistency of length) is thus achieved over two adjacent partial sections, even if these partial sections are curved in different directions.

Preferably, the corrugated section is completely bridged by at least one tie rod or several tie rods overlapping in the longitudinal direction. This is advantageous, in particular, when the corrugated section is arranged between two areas of the fluid line which are inherently stable in shape and thus also in length. Because a continuous protection is provided with respect to a change in length in the section, the entire length of the fluid line can change only to a permissible extent.

It is also advantageous if the tie rod has a width B=D/2±about 20% in the circumferential direction, wherein D is an inside diameter of the wave trough of the fluid line outside the tie rod. The tie rod thus has a relatively large width in the circumferential direction, so that it can withstand even larger forces which otherwise would lead to a change in length. However, on the other hand, it is also still narrow enough to permit a curvature of the fluid line in the partial section.

Preferably, the tie rod has flanks running in the longitudinal direction, which flanks run at an angle in the range of about 0° to about 45° to the radial direction. In cross section, the tie rod therefore has the shape of a rectangle or a trapezoid or a combination thereof, i.e., the angles of the two flanks can be substantially identical, but do not need to be identical. The precise angle is determined, among other things, by the wall thickness of the fluid line, by the desired radius of curvature of the fluid line in the partial section, and optionally by the production method used.

Preferably, the fluid line has a shape of a curve in the partial section, with the tie rod being arranged in the circumferential direction between an inward curvature and an outward curvature of the curve. With the inward curvature of the curve, the fluid line is compressed. With the outward curvature of the curve, the fluid line is stretched. The compression and the stretching (i.e., tension) are made possible by the wave peaks and the wave troughs. However, the tie rod lies in an area which is virtually not compressed or stretched at all or only to a slight extent. These small compression or stretching forces can be essentially or substantially absorbed by the material of the tie rod.

It is also advantageous if at least one wave trough in the corrugated section is not bridged by a tie rod. The reinforcement is thus interrupted in this area and there is a risk of a change in length. However, if this risk is limited to one wave trough, it can be acceptable because of an improved shaping of the fluid line can be achieved thereby.

The invention also provides for a fluid line comprising at least one corrugated section having wave peaks and wave troughs and at least one tie rod arranged in at least one portion of the corrugated section and being coupled to plural wave peaks.

The at least one tie rod may comprise two tie rods generally arranged one of diametrically opposite one another and about 180 degrees apart from one another. The at least one tie rod may at least one of have portions which fill the plural wave troughs and have portions which extend into the plural wave troughs. The at least one tie rod may define an internal spacing which is at least one of an elongate axial spacing, an elongate spacing oriented along a longitudinal direction of the fluid line, an axial spacing which is free of wave troughs, an axial spacing which is free of wave peaks and wave troughs, an axial spacing that forms a circumferential gap in the wave troughs, not intersected by wave troughs when viewed from a direction generally parallel to a center axis of the fluid line, and is defined by an inner surface of a wall forming the at least one tie rod and an imaginary circle formed by an innermost internal diameter of the at least one corrugated section.

The at least one tie rod may extend along a longitudinal direction that is generally parallel to an axis passing through the at least one corrugated section. The at least one tie rod may comprise two tie rods angularly offset from one another. The two tie rods may be angularly offset from one another by about 180 degrees. At least one of the two tie rods may at least partially overlap one another along the longitudinal direction, the two tie rods may at least partially overlap one another such that end portions of each of the two tie rods extend into a respective partial section, the two tie rods may have lengths measured along the longitudinal direction that, when added together, are longer than a length of the at least one corrugated section, the two tie rods may resist or prevent bending of at least a portion of the at least one corrugated section along a plane defined by a center line of the at least one corrugated section and a midpoint of each of the two tie rods, and the two tie rods may be integrally formed and resist or prevent bending of at least a portion of the at least one corrugated section.

The two tie rods may at least partially overlap one another along the longitudinal direction by an amount approximately equal to at least one wave trough. At least one of the two tie rods may have lengths measured along the longitudinal direction that, when added together, are longer than a length of the at least one corrugated section and have opposite facing ends which extend to beginning and end areas of the at least one corrugated section and the two tie rods may each have a length measured along the longitudinal direction that is generally equal to a length of the at least one corrugated section.

The at least one tie rod may have a length measured along a longitudinal direction that is shorter than a length of the at least one corrugated section and has one end which extends to beginning area of the at least one corrugated section. The at least one tie rod may have a length measured along a longitudinal direction that is generally equal to a length of the at least one corrugated section. The at least one tie rod may have a width B=D/2±about 20% measured in a circumferential direction, wherein D is an inside diameter of a wave trough. The at least one tie rod may comprise flanks running in a longitudinal direction and being oriented at an angle "a" in the range of about 0° to about 45° relative to a radial direction.

At least one of an outermost diameter of the at least one corrugate section may be approximately equal to an imaginary circle which contains therein the least one tie rod and an innermost diameter of the at least one corrugate section may be approximately equal to an imaginary cylinder having an outside surface in contact with the wave troughs. At least one wave trough in the at least one corrugated section may not be bridged by any portion of the at least one tie rod.

The invention also provides for a fluid line comprising at least one corrugated section having wave peaks and wave troughs and at least one axially oriented stiffener arranged to at least one of resist or prevent bending of at least a portion of the at least one corrugated section along a plane defined by a center line of the at least one corrugated section and a midpoint of the at least one connecting member and resist or prevent a change in length of at least a portion of the at least one corrugated section along a center line of the at least one corrugated section.

The at least one stiffener may comprise two stiffeners generally arranged one of diametrically opposite one another and about 180 degrees apart from one another.

The invention also provides for a fluid line comprising at least one corrugated section having wave peaks and wave troughs and at least one integrally formed stiffener arranged to at least one of resist or prevent bending of at least a portion of the at least one corrugated section along a first plane defined by a center line of the at least one corrugated section and a midpoint of the at least one connecting member and resist or prevent a change in length of at least a portion of the at least one corrugated section along a center line of the at least one corrugated section. The portion is bendable along a second plane that is generally perpendicular to the first plane.

The at least one integrally formed stiffener may comprise two integrally formed stiffeners generally arranged one of diametrically opposite one another and about 180 degrees apart from one another.

The invention also provides for a method of making the fluid line of the type described above, wherein the method comprises forming at least one corrugated section at an end area or beginning area of a generally cylindrical section of the fluid line.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a first embodiment of a fluid line with a corrugated section;

FIG. 2 shows a second embodiment of the corrugated section;

FIG. 3 shows a third embodiment of the corrugated section;

FIG. 4 shows a side view of a section of the corrugated section according to FIG. 1; and FIG. 5 shows a section V-V according to FIG. 4.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In all of the figures identical elements that correspond to one another are labeled with the same reference numbers.

FIG. 1 shows a fluid line 1 having a corrugated section 2. The corrugated section has wave peaks 3 and wave troughs 4 arranged therebetween.

A non-corrugated section 5 adjoins the corrugated section 2 at one end, and another non-corrugated section 6 adjoins it at the other end. The sections 5, 6 can be generally cylindrical. The corrugated section 2 can be divided into two partial sections 7, 8, which, in this embodiment, curved in different directions. Each partial section 7, 8 has at least three, preferably at least five wave peaks 3, and accordingly two or preferably four wave troughs 4, in order to be able to realize an appreciable or significant bending angle of the fluid line.

In each partial section 7, 8, all of the wave peaks 3 are connected to one another by one or more tie rods 9, 10. Each tie rod 9, 10 functions as a stiffener by resisting tension and/or compression in at least the axial direction. Accordingly, the wave peaks 3, which are connected to one another by the tie rods 9, 10, cannot be moved apart from one another or towards one another. The tie rod 9, 10 thus ensures that in the partial section 7, 8 virtually no change in length can occur that goes beyond an extension or shrinkage of the material of which the tie rods 9, 10 are made. In simply terms, this is referred to as "consistency in length," even if a real consistency of the length cannot be achieved as a rule. A change in length of, for example, about 5% is still considered to be acceptable. In many cases, however, a change in length of about 4%, about 3% or even only about 2% typically results due to the tie rod. Preferably, the material of the tie rod 9, 10 is the same as the material of the fluid line 1 such that the tie rod and corrugated section are formed as a one-piece member and/or integrally formed member.

As can be seen from FIG. 5, a further tie rod 10 can be arranged opposite the tie rod 10, that is, offset by about 180° in the circumferential direction. The additional tie rod likewise connects all of the wave peaks 3 of the partial section 8 to one another. A curvature of the partial section 8 is therefore possible only in that a curve is produced in which the tie rod 10 is arranged between an inward curvature of the curve and an outward curvature. Based on the representation of FIG. 1, section 6 can therefore be curved forwards or backwards with respect to section 5.

In a corresponding manner, in the partial section 7, in which the tie rod 9 is offset by about 90° in the circumferential direction with respect to the tie rod 10, the section 6 can be curved upwards or downwards with respect to the section 5. Other bending is resisted and/or prevented by the tie rod(s) 9.

The two tie rods 9, 10 overlap one another in an area of two wave troughs 4a, 4b. Accordingly, the corrugated section 2 is completely bridged by two tie rods 9, 10 overlapping one another. A change in length between the two sections 5, 6 is thus at least largely avoided.

A corresponding tie rod, which cannot be seen in FIG. 1, is also preferably arranged on the opposite side of the tie rod 9 and/or angularly offset by about 180 degrees.

The tie rods 9, 10 preferably completely fills the wave troughs 4 between the wave peaks 3 of a partial section 7, 8. As is shown, each tie rod 9, 10 has portions that approximately end with the wave peaks 3 (or with radially outward portions thereof). A radial extension of each tie rod 9, 10 defines a height H, which can be, e.g., about 30% larger or smaller than a difference defined by dimension "A" between the foot of a wave trough 4 and the tip of a wave peak 3.

As can be seen in FIG. 5, the tie rod(s) 10 forms a cavity 11, which is connected to and/or open to an interior 12 of the fluid line 1. The cavity 11 extends axially and/or in a longitudinal direction. The interior 12 thus forms a radial bulge where the tie rod 10 and a wave trough 4 intersect. All of the directional data, such as radial and axial directions, relate to an axis 13 of the fluid line. The interior contour of wave trough 4 thus follows the outer contour. The tie rods 9 are preferably similarly configured as tie rods 10 in FIG. 10.

The tie rod 10 (the same applies in a corresponding manner to the tie rod 9) has an extension or width "B" measured in the circumferential direction. By way of non-limiting example, the following applies: B=D/2±about 20%, where D is the inside diameter of the fluid line 1 in the area of a wave trough 4 outside the tie rod 10. The dimension "W" is the wall thickness of the fluid line which is preferably generally uniform. This results in a relatively large width of the tie rod 10, which on the one hand permits a bending of the partial section 8, but on the other hand provides adequate stability against a change in length.

The tie rods 9, 10 preferably has the shape of a rectangle or a trapezoid in cross section. It preferably has flanks 14, which run in the longitudinal direction and form an angle "a" in the range of about 0° to about 45° with respect to the radial direction. The size of the angle "a" is determined by the wall thickness W, by the production method used to form the corrugated section and tie rods, by the desired curvature of the fluid line in the corrugated area, by the material used, among other things. The angle "a" is preferably identical, but does not need to be identical for both flanks 14. Thus a smaller angle "a" can be used on the inside of a curvature than on the outside.

The fluid line 1 is preferably made from a synthetic material. In particular, polymers or polymer combinations can be considered as synthetic materials, preferably thermoplastic polymer materials, such as are disclosed, for example, in DE 44 32 584 C1, the entire disclosure of which is hereby expressly incorporated by reference.

FIG. 2 shows a modified embodiment of the corrugated section 2, in which only one partial section is present. This partial section 2 is completely bridged by the two tie rods 9 arranged on opposite sides of the fluid line 1, i.e., lying diametrically opposite one another. Each tie rod 9 connects the two sections 5, 6 arranged on both ends of the corrugated section 2.

FIG. 3 shows a modification of the embodiment shown in FIG. 1 in which two partial sections 7, 8 are similarly provided. Two tie rods 9 are provided in the partial section 7 and two tie rods 10 are provided in the partial section 8. However, a wave trough 4c is present between the two partial sections 7, 8, in which tie rod is provided, i.e., there is no overlapping of the tie rods 9, 10 and the area with wave trough 4c allows for at least partial bending of the section 8 relative to section 7 in any direction. This wave trough can thus be used to render possible a greater bending of the fluid line 1 in any direction.

The use of the tie rod or tie rods 9, 10 provides the additional advantage of an improved thermofixing. The shape of the fluid line 1 is better retained after cooling than before due to the use of the tie rods 9, 10.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A fluid line comprising:
   at least one corrugated section having wave peaks and wave troughs; and
   at least one tie rod being arranged in at least one portion of the corrugated section and being coupled to tips of plural wave peaks,
   wherein the at least one tie rod has a width B=D/2±about 20% measured in a circumferential direction, wherein D is an inside diameter of a wave trough.

2. The fluid line of claim 1, wherein the at least one tie rod comprises two tie rods generally arranged one of:
   diametrically opposite one another; and
   about 180 degrees apart from one another.

3. The fluid line of claim 1, wherein the at least one tie rod at least one of:
   has portions which fill the plural wave troughs; and
   has portions which extend into the plural wave troughs.

4. The fluid line of claim 1,
   wherein the at least one tie rod defines an internal spacing which is at least one of:
   an elongate axial spacing;
   an elongate spacing oriented along a longitudinal direction of the fluid line;
   an axial spacing which is free of wave troughs;
   an axial spacing which is free of wave peaks and wave troughs;
   an axial spacing that forms a circumferential gap in the wave troughs;
   not intersected by wave troughs when viewed from a direction generally parallel to a center axis of the fluid line;
   defined an internal cross-section that follows an external cross-section of the fluid line; and
   defined by an inner surface of a wall forming the at least one tie rod and an imaginary circle formed by an innermost internal diameter of the at least one corrugated section.

5. The fluid line of claim 1, wherein the at least one tie rod extends along a longitudinal direction that is generally parallel to an axis passing through the at least one corrugated section.

6. The fluid line of claim 1, wherein the at least one tie rod comprises two tie rods angularly offset from one another.

7. The fluid line of claim 6, wherein the two tie rods are angularly offset from one another by about 180 degrees.

8. The fluid line of claim 6, wherein at least one of:
   the two tie rods at least partially overlap one another along the longitudinal direction;
   the two tie rods at least partially overlap one another such that end portions of each of the two tie rods extend into a respective partial section;
   the two tie rods have lengths measured along the longitudinal direction that, when added together, are longer than a length of the at least one corrugated section;
   the two tie rods prevent bending of at least a portion of the at least one corrugated section along a plane defined by a center line of the at least one corrugated section and a midpoint of each of the two tie rods; and
   the two tie rods are integrally formed and resist bending of at least a portion of the at least one corrugated section.

9. The fluid line of claim 6, wherein the two tie rods at least partially overlap one another along the longitudinal direction by an amount approximately equal to at least one wave trough.

10. The fluid line of claim 6, wherein at least one of:
    the two tie rods have lengths measured along the longitudinal direction that, when added together, are longer than a length of the at least one corrugated section and have opposite facing ends which extend to beginning and end areas of the at least one corrugated section; and
    the two tie rods each have a length measured along the longitudinal direction that is generally equal to a length of the at least one corrugated section.

11. The fluid line of claim 1, wherein the at least one tie rod has a length measured along a longitudinal direction that is shorter than a length of the at least one corrugated section and has one end which extends to beginning area of the at least one corrugated section.

12. The fluid line of claim 1, wherein the at least one tie rod has a length measured along a longitudinal direction that is generally equal to a length of the at least one corrugated section.

13. The fluid line of claim 1, wherein the at least one tie rod comprises flanks running in a longitudinal direction and being oriented at an angle "a" in the range of about 0° to about 45° relative to a radial direction.

14. The fluid line of claim 1, wherein at least one of:
    an outermost diameter of the at least one corrugate section is approximately equal to an imaginary circle which contains therein the least one tie rod; and
    an innermost diameter of the at least one corrugate section is approximately equal to an imaginary cylinder having an outside surface in contact with the wave troughs.

15. The fluid line of claim 1, wherein at least one wave trough in the at least one corrugated section is not bridged by any portion of the at least one tie rod.

16. A method of making the fluid line of claim 1, comprising:
forming at least one corrugated section at an end area or beginning area of a generally cylindrical section of the fluid line.

17. A fluid line comprising:
at least one corrugated section having wave peaks and wave troughs; and
at least one axially oriented stiffener arranged to at least one of:
resist or prevent bending of at least a portion of the at least one corrugated section along a plane defined by a center line of the at least one corrugated section and a midpoint of the at least one axially oriented stiffener; and
resist or prevent a change in length of at least a portion of the at least one corrugated section along a center line of the at least one corrugated section,
wherein the at least one axially oriented stiffener connects plural wave peaks and defines an internal spacing which is at least one of:
an elongate axial spacing;
an elongate spacing oriented along a longitudinal direction of the fluid line;
an axial spacing which is free of wave troughs;
an axial spacing which is free of wave peaks and wave troughs;
an axial spacing that forms a circumferential gap in the wave troughs;
not intersected by wave troughs when viewed from a direction generally parallel to a center axis of the fluid line;
defined an internal cross-section that follows an external cross-section of the fluid line; and
defined by an inner surface of a wall forming the at least one tie rod and an imaginary circle formed by an innermost internal diameter of the at least one corrugated section, and
wherein, when viewed in the longitudinal direction, the internal spacing has a substantially rectangular cross-section.

18. The fluid line of claim 17, wherein the at least one stiffener comprises two stiffeners generally arranged one of:
diametrically opposite one another; and
about 180 degrees apart from one another.

19. A method of making the fluid line of claim 17, comprising:
forming at least one corrugated section at an end area or beginning area of a generally cylindrical section of the fluid line.

20. A fluid line comprising:
at least one corrugated section having wave peaks and wave troughs; and
at least one integrally formed stiffener arranged to at least one of:
resist or prevent bending of at least a portion of the at least one corrugated section along a first plane defined by a center line of the at least one corrugated section and a midpoint of the at least one integrally formed stiffener; and
resist or prevent a change in length of at least a portion of the at least one corrugated section along a center line of the at least one corrugated section,
wherein the portion is bendable along a second plane that is generally perpendicular to the first plane, and
wherein the at least one integrally formed stiffener defines an internal spacing which is at least one of:
an elongate axial spacing;
an elongate spacing oriented along a longitudinal direction of the fluid line;
an axial spacing which is free of wave troughs;
an axial spacing which is free of wave peaks and wave troughs;
an axial spacing that forms a circumferential gap in the wave troughs;
not intersected by wave troughs when viewed from a direction generally parallel to a center axis of the fluid line;
defined an internal cross-section that follows an external cross-section of the fluid line; and
defined by an inner surface of a wall forming the at least one tie rod and an imaginary circle formed by an innermost internal diameter of the at least one corrugated section.

21. The fluid line of claim 20, wherein the at least one integrally formed stiffener comprises two integrally formed stiffeners generally arranged one of:
diametrically opposite one another; and
about 180 degrees apart from one another.

22. A method of making the fluid line of claim 20, comprising:
forming at least one corrugated section at an end area or beginning area of a generally cylindrical section of the fluid line.

23. A fluid line comprising:
at least one corrugated section having wave peaks and wave troughs; and
at least one tie rod arranged in at least one portion of the corrugated section and connecting plural wave peaks together,
wherein the at least one tie rod defines an internal spacing which is at least one of:
an elongate axial spacing;
an elongate spacing oriented along a longitudinal direction of the fluid line;
an axial spacing which is free of wave troughs;
an axial spacing which is free of wave peaks and wave troughs;
an axial spacing that forms a circumferential gap in the wave troughs;
not intersected by wave troughs when viewed from a direction generally parallel to a center axis of the fluid line; and
defined an internal cross-section that follows an external cross-section of the fluid line; and
defined by an inner surface of a wall forming the at least one tie rod and an imaginary circle formed by an innermost internal diameter of the at least one corrugated section.

24. A fluid line comprising:
at least one corrugated section having wave peaks and wave troughs; and
at least one tie rod being arranged in at least one portion of the corrugated section and being coupled to tips of plural wave peaks,
wherein at least a portion of the at least one tie rod is formed over the tips of the plural wave peaks.

* * * * *